Patented July 2, 1935

2,006,735

UNITED STATES PATENT OFFICE 2,006,735

NITRO-ARYL AMINO-ARYL AMINES

Erich Fischer, Bad Soden-on-the-Taunus, and Emil Mahler, Frankfort-on-the-Main-Hochst, Germany, assignors to General Aniline Works, Inc., New York, N. Y., a corporation of Delaware No Drawing. Application November 7, 1933, Serial No. 697,081. In Germany November 17, 1932

5 Claims. (Cl. 260—109)

The present invention relates to new nitro-aryl amino-aryl amines which are valuable dyestuffs, more particularly it relates to new dyestuffs of the general formula:

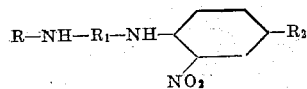

wherein R and $R_1$ represent radicals of the benzene series or R means a cyclohexyl radical and $R_1$ a radical of the benzene series, the NH-groups standing in para-positions to each other, and $R_2$ stands for a radical of the group consisting of COOH, COO-metal, COO-alkyl and

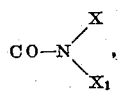

wherein X means hydrogen and $X_1$ hydrogen, alkyl, phenyl or cyclohexyl, or X and $X_1$ represent alkyl radicals.

Our new dyestuffs are obtainable by condensing para-aminodiphenylamine, including its homologues, substitution and hydrogenation products, with a 4-halogen-3-nitro-1-benzoic acid or benzoic acid compound of the general formula:

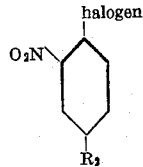

wherein $R_2$ has the above identified meaning.

The condensation of the said components is preferably effected in any suitable solvent or diluent, such as in water or alcohol or other organic solvents or in mixtures of different solvents with or without the addition of an acid binding agent, such as sodium carbonate, sodium acetate, chalk or the like, according to known methods.

The preparation of the dyestuffs may further be effected by first condensing with the 4-halogen-3-nitro-1-benzoic acid compound a para-amino-diphenylacyl compound of the schematic formula:

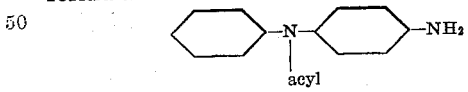

and then splitting off the acyl group from the condensation products. The condensation reaction is carried out by heating in an open vessel or under pressure or in a stream of nitrogen.

The new dyestuffs dye, so far as they contain a sulfonic acid group, the animal fiber brown tints of good fastness properties. The non-sulfonated dyes are suitable for dyeing cellulose esters and ethers. It is remarkable and very surprising that the new dyestuffs above identified are superior with regard to their fastness to light to those dyestuffs which are obtainable, for instance, from 4-halogen-3.5-dinitro-1-benzoic acid.

The following examples serve to illustrate the invention, but they are not intended to limit it thereto, the parts being by weight:

(1) 201.5 parts of 4-chloro-3-nitro-1-benzene-carboxylic acid are dissolved in water by adding sodium carbonate to form the sodium salt; 184 parts of para-amino-diphenylamine and an excess of chalk are added thereto. The mixture is heated to boiling, while stirring until the condensation is finished. The whole is filtered by suction, the residue is extracted by boiling with dilute hydrochloric acid, and the reaction product is crystallized from water in the form of its sodium salt. The sodium salt forms a product which is soluble in hot water. The dyestuff dyes acetate silk brown tints of good fastness to light. It has the following formula:

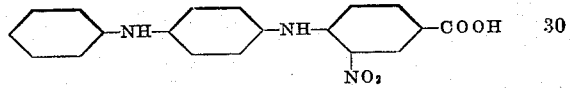

(2) 264 parts of 4-amino-diphenylamine-2-sulfonic acid and 202 parts of 4-chloro-3-nitrobenzoic acid are dissolved, while adding 160 parts of sodium carbonate, in 2500 parts to 3000 parts of water and the whole is heated to boiling as long as the formation of the dyestuff increases. The solution gradually turns intensely red-brown. The dyestuff is isolated in the usual manner in the form of its sodium salt and a red-brown powder is thus obtained which easily dissolves in warm water and which dyes wool very even red-brown tints.

The dyestuff corresponds to the following formula:

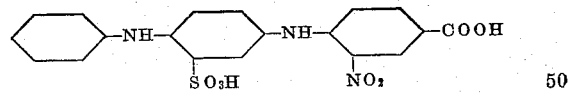

Dyestuffs of similar properties are obtainable by replacing 4-chloro-3-nitro-1-benzoic acid by, for instance, 4-chloro-3-nitro-1-benzoic acid-ethyl-ester, -methylester, -propylester or 4-chloro-3-nitro-1-benzoic acid-amide. Instead of the latter there may also be used other amides such as, for instance, 4-chloro-3-nitro-1-benzoic acid-methylamide, -ethylamide, -phenylamide, -cyclohexylamide, -dimethylamide, -diethylamide or other compounds which are analogous to those in the specific examples.

Instead of the 4-amino-diphenylamine-2-sulfonic acid analogous compounds may be used, for instance, 4-amino-4'-methoxy-diphenylamine-2-sulfonic acid or 1-amino-4-cyclohexylamino-3-sulfonic acid or 4-amino-4'-acetamino-diphenylamine-2-sulfonic acid.

(3) 268 parts of 4-amino-4'-methyl-diphenylamine are dissolved in water, while adding 40 parts of magnesium oxide, and 246 parts of 4-bromo-3-nitro-1-benzoic acid are then added. Thereupon, a further quantity of 60 parts of magnesium oxide is introduced into the mixture and the whole is heated to boiling until the reaction is finished. The reaction product is precipitated by means of acid, filtered by suction and washed with water. The dyestuff is then dissolved in hot water and salted out by means of common salt. The dyestuff corresponds to the following formula:

We claim:
1. The compounds of the following general formula:

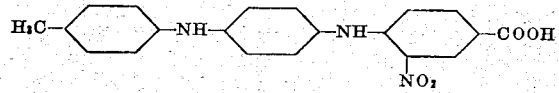

wherein R and $R_1$ represent radicals of the benzene series or R means a cyclohexyl radical and $R_1$ a radical of the benzene series the NH-groups standing in para-positions to each other, and $R_2$ stands for a radical of the group consisting of COOH, COO-metal, COO-alkyl and

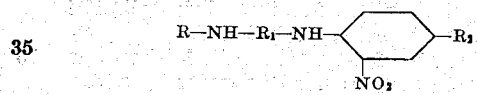

wherein X means hydrogen and $X_1$ hydrogen, alkyl, phenyl or cyclohexyl, or X and $X_1$ represent alkyl radicals.

2. The compounds of the following general formula:

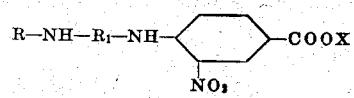

wherein R and $R_1$ represent radicals of the benzene series, the NH-groups standing in para-positions to each other and wherein X stands for hydrogen or alkyl.

3. The compound of the formula:

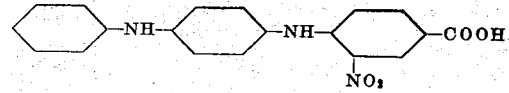

dyeing acetate silk brown tints of good fastness to light, being soluble in the form of the alkali metal salt in hot water.

4. The compound of the formula:

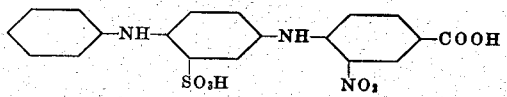

being when isolated in the form of the sodium salt a red-brown powder, easily soluble in warm water and dyeing wool from an acid bath even red-brown tints.

5. The compound of the formula:

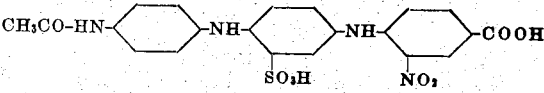

being when isolated in the form of the sodium salt a red-brown powder, easily soluble in warm water and dyeing wool from an acid bath even red-brown tints.

ERICH FISCHER.
EMIL MAHLER.